UNITED STATES PATENT OFFICE.

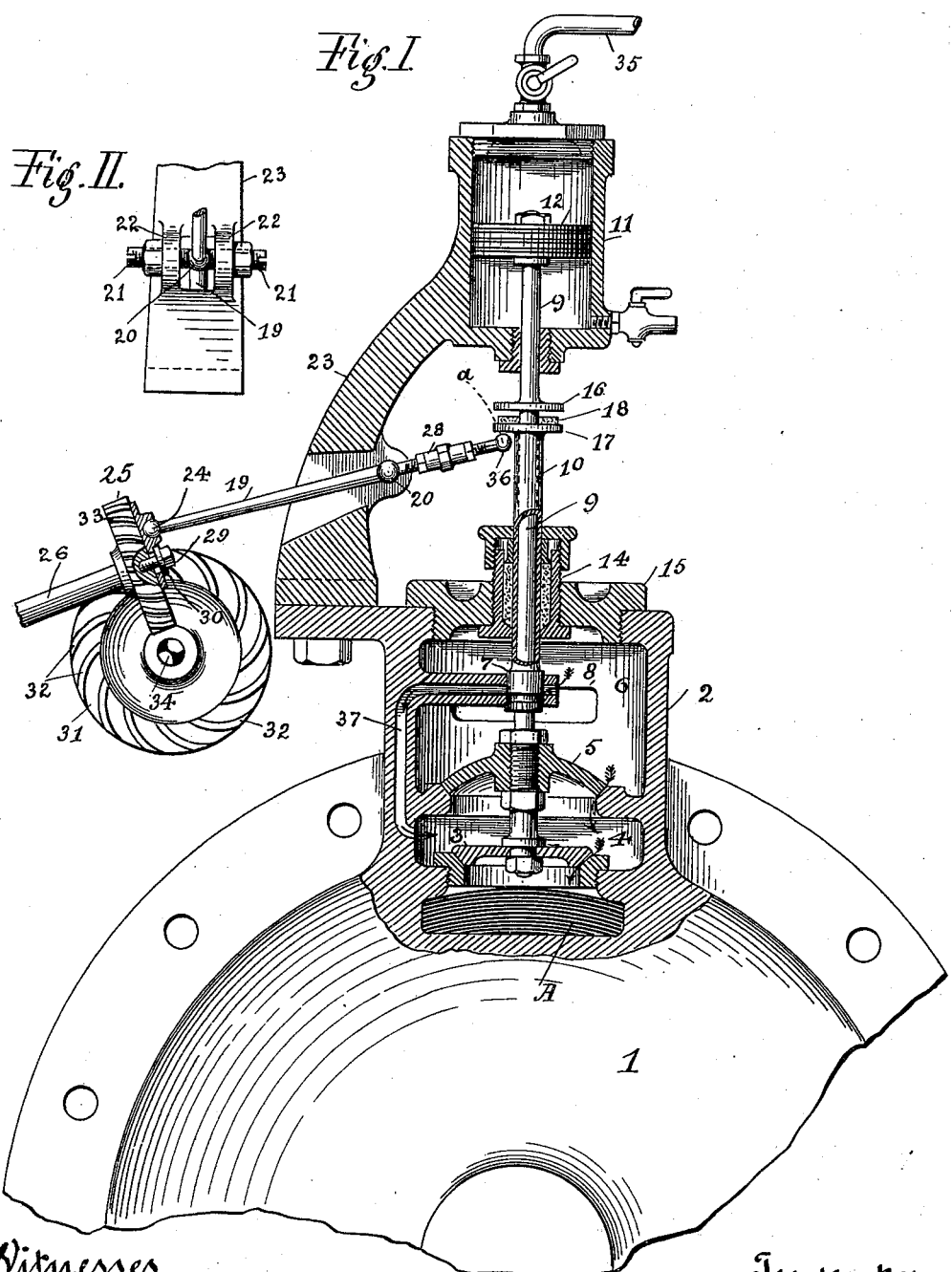

AUGUSTUS HOWARD, OF SAN FRANCISCO, CALIFORNIA, ASSIGNOR TO WILLARD REED GREEN, OF DENVER, COLORADO.

VALVE-GEAR FOR ENGINES.

SPECIFICATION forming part of Letters Patent No. 617,528, dated January 10, 1899.

Application filed June 10, 1898. Serial No. 683,097. (No model.)

*To all whom it may concern:*

Be it known that I, AUGUSTUS HOWARD, a citizen of Great Britain, residing at San Francisco, county of San Francisco, and State of California, have invented certain new and useful Improvements in Induction-Valves; and I hereby declare the following to be a full, clear, and exact description of the same, reference being had to the accompanying drawings, forming a part of this specification.

My invention relates to improvements in induction-valves and gearing to actuate the same.

My invention makes use of the pressure of the motive fluid employed in actuating the engine to balance said valves, and may be either with or without the assistance and cooperation of the weight or pressure of the atmosphere.

My invention consists of a series of valves of different areas or regulated to act under different pressures, whereby said valves cooperate to alternately or successively balance to seat and unseat the main or induction valve of the engine, so that the difference in the relative pressures upon the various valves is the only factor to be dealt with, and of mechanical means for handling said differences.

I preferably employ two valves of unequal areas on one stem, the pressure of the operating fluid thereon being, in part, balanced or compensated by a piston having a vacuum or partial vacuum on one side and a pressure above the atmosphere on the other side, an auxiliary by-pass valve to equalize the pressure on the two induction-valves, and mechanism to actuate the whole in proper relation to the position and movement of an engine-piston.

The manner of constructing and operating my improved induction-valve is set forth in the following specification, of which the drawings illustrating my invention form a part.

Referring to the drawings, Figure 1 is an elevation, mainly in section, illustrating one of my improved induction-valves, a portion of the cylinder-head to which it is attached, and the gearing to operate the same. Fig. 2 is a detail of Fig. 1, at a right angle thereto, showing the manner of constructing the fulcrum of the valve-operating lever.

1 is a portion of a head or cover for an engine-cylinder, and 2 a valve-box made integral therewith. 3 is the smaller of the two induction-valves, opening communication between the chamber 4 and the cylinder 1. 5 is the larger of the two induction-valves, opening communication between the chambers 6 and 4, and 7 is an auxiliary valve of the piston type, also opening communication between the chambers 6 and 4.

37 is a small by-pass or passage between the chambers 6 and 4.

The operating fluid, which may be steam, gas, or air, enters through the passage 8 into the chamber 6, and from thence flows through the valves 5 and 3 and into the engine-cylinder through the passage A, as indicated by the arrows in Fig. 1. The valves 3 and 5 are attached to a stem 9, that extends up through a sleeve 10 into a cylinder 11, and is attached to a piston 12. The auxiliary valve 7 is attached to the sleeve 10 and moves therewith, the latter passing through the gland 14, screwed into the valve-box cover 15.

On the stem 9 is a tappet-collar 16, and on the stem 10 is a similar collar 17. Between these collars is a spring 18, which may be of metal or india-rubber, that prevents concussion in working, as will be hereinafter explained.

To operate the stem 9, sleeve 10, and the valves thereon, I employ a gyratory lever 19, fulcrumed by a ball-bearing 20, and supported between the concave-ended screws 21, inserted through the lugs 22 on the standard 23, that supports the cylinder 11.

The gyratory lever 19 is connected by a ball-bearing 24 to the face of a wheel 25 on the shaft 26, the latter being mounted in suitable bearings connected to the engine-cylinder or any stationary part of the engine-frame.

The lever 19 is made extensible or adjustable in length by a screw-sleeve 28, and the range of its gyratory motion is regulated by sliding the bearing 24 outward or inward on the face of the wheel 25, a screw 29, passing through a slot in the flange 30, permitting this adjustment.

The wheel 25 is driven by a face-wheel 31, provided with curved teeth 32, that mesh into corresponding spiral teeth 33 on the wheel 25 after the manner of the gearing described in Letters Patent No. 602,161, granted to me April 12, 1898, for improvements in motive engines. The face-wheel 31 is mounted on a shaft 34, that is positively geared to the crank-shaft of the engine, and with the wheel 25 moves at a uniform rate therewith.

The upper portion of the cylinder 11 is partially exhausted of air through the pipe 35, connected to an air-pump or other means of removing the air, and the resulting pressure from the lower side of the cylinder 11 may be increased by means of a force-pump or by any other known method to any pressure desired, care being taken that said pressure is not too great to prevent the induction-valves 3 and 5 from closing quickly when desired, under the influence of the working pressure of the steam, gas, air, or vapor, as the case may be. It will be seen that the relation between the piston 12 and valve 3 will be as the area of piston 12 and the pressure thereon are in proportion to the area of valve 3 and the pressure thereon, or working pressure. This relation should be approximately equality, and it may be adjusted and controlled in accordance with the structure and working conditions of the engine.

The operation is as follows: The pressure upon piston 12 creates an upward pull on stem 9 and the valves 3 and 5, which pressure is nearly sufficient to raise and sustain the weight of valve 3, with the working pressure thereon, after the pressure of the working medium upon valve 5 has been balanced and removed, but not enough to raise valve 5 while under the pressure of said working medium. The upward pressure upon piston 12 being less than that of the working fluid on the top or back of the valve 5, no movement will occur until the end 36 of the lever 19 comes in contact with the tappet-collar 17, raises the sleeve 10 and the valve 7, and thereby admits the steam or other working fluid through the passage 37 and from chamber 6 to chamber 4, and puts the valve 5 into equilibrium and leaves valve 3 to alone resist the upward pull of piston 12 upon it. The lever 19 then instantly raises the stem 9 and the valves 3 and 5, thereby permitting a free flow of the working fluid from the chamber 6 to cylinder 1. As the upward pull of piston 12 is substantially equal to the pressure upon the back of valve 3, the resistances to be overcome by the mechanism or the work to be done by the lever is practically only that of friction and gravity. This may be very nicely adjusted and reduced to but a few pounds. To time and control the opening of the valves 3 and 5, the tappet-collar 17 follows the one 16 and by the interposed spring 18 raises the latter and the stem 9 with the induction-valves thereon in accordance as said lever is set or operatively connected with the engine-piston. When the end 36 of the lever 19 moving in the arc $a$ passes and releases the tappet-collar 17, the valves 7, 5, and 3 are instantly closed by draft and pressure of the working fluid, thus cutting off its flow to the engine-cylinder.

In the drawings it will be seen that the areas of piston 12 and valve 3 are shown as being nearly equal. Hence the relation between the working conditions of the two will be as the pressures in the boiler and in cylinder 11, respectively. These may be regulated to suit requirements.

Adjustment to determine the point of opening and closing the induction-valves 3 and 5 is provided by the position of the wheel 25 in respect to the engine stroke by moving the bearing 24 or by lengthening or shortening the lever 19, as the conditions may require.

The gyratory movement of the end 36 of the lever 19 and its friction on the collar 17 produce a turning force on the shell 10, that is communicated to the stem 9, causing a slow rotation of all the valves, causing them to wear uniformly and not leak. It also causes the removal of any foreign obstruction on the faces or the seats of these valves and insures their perfect reseating.

The faces of one or all of the tappet-collars may be milled, chased, or roughened in any way to insure the same gripping upon the end of the lever 19.

The balls on the ends of the gyrating lever 19 may be made stationary or rotating upon said lever, as the case may require.

The induction-valves and their bearings and supports may, if desired, be placed upon and attached to the cylinders of the engine instead of being placed upon the cylinder-heads.

While the invention has been described as applicable to a motive engine, it is obvious that it may be used or applied to any mechanism or device where an elastic medium under pressure is to be dealt with or transmitted from one vessel or chamber to another without departing from the principle of the invention.

Having thus explained the nature and objects of my invention, I claim as novel and desire to secure by Letters Patent—

1. In induction-valves, two valves 3 and 5 of unequal area attached to one stem 9, the latter provided with a piston exerting an upward or opening force on said valves for balancing the same.

2. In induction-valves, the combination of valves 3 and 5, connected to a stem 9, and shell 10, the latter integral with or connected to a supplementary valve 7 controlling a passage 37 to admit the working fluid between the two first-named valves.

3. In induction-valves, the two valves 3 and 5, a movable stem on which these valves are mounted, a shell surrounding this stem provided with auxiliary valve 7 and tappet-collars 16 and 17, whereby the stem and shell are raised and the valves thereon opened, substantially as specified.

4. In induction-valves, the valves 3 and 5 mounted upon the stem 9, an auxiliary valve 7 attached to the shell 10 sliding upon the stem 9, tappet-collars 16 and 17 and means to raise these collars successively, one impinging upon the other.

5. In induction-valves, the combination of the valves 3 and 5, the movable stem on which these valves are mounted, a piston attached to the stem and moving in a cylinder 11 and operated on one side by a vacuum and on the other side by pressure with means for operating the same.

6. In induction-valves, induction-valves 3 and 5, the auxiliary valve 7 and passage 37 whereby fluid is admitted between the valves to balance the pressure on valve 5, the gyratory lever 19 to raise and open the valves, pivoted on a spherical bearing in the middle and made extensible at 28, substantially as specified.

7. In induction-valves, the combination of the valve-stem 9, valves 3 and 5, sleeve 10, auxiliary valve 7, tappet-collars 16 and 17 with the gyratory lever 19 and adjustable bearing 24, whereby the sweep of the lever is regulated substantially as specified.

8. In induction-valves, the combination of the face-wheel 32 operatively connected to the engine-shaft, the wheel 33 provided with the adjustable eccentric-plate 30 and the gyratory lever 19 to raise and open the valves, combined and operating substantially as specified.

9. In induction-valves, in combination, the valves 3 and 5, stem 9, valve 7, and shell 10 for operating the same, a gyratory lever revolving on a fulcrum, imparting a rotating motion to said valves and opening said valves at a given part of its revolution.

In testimony whereof I affix my signature in presence of two witnesses.

AUGUSTUS HOWARD.

Witnesses:
WALTER B. PAYNE,
ALEXANDER S. STEUART.